(12) United States Patent
Bruce et al.

(10) Patent No.: US 10,388,096 B2
(45) Date of Patent: *Aug. 20, 2019

(54) SELECTIVE SEATING CONTROLLER

(71) Applicant: International Business Machines Corporation, Armonk, NY (US)

(72) Inventors: Edwin J. Bruce, Corinth, TX (US); Tassanee K. Supakkul, Euless, TX (US); Janki Y. Vora, Dallas, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/131,506

(22) Filed: Sep. 14, 2018

(65) Prior Publication Data

US 2019/0012862 A1 Jan. 10, 2019

Related U.S. Application Data

(63) Continuation of application No. 15/191,890, filed on Jun. 24, 2016.

(51) Int. Cl.
*G07C 9/00* (2006.01)
*G06Q 10/00* (2012.01)
*G06Q 10/02* (2012.01)

(52) U.S. Cl.
CPC ......... *G07C 9/00571* (2013.01); *G06Q 10/00* (2013.01); *G06Q 10/02* (2013.01); *G07C 9/00182* (2013.01)

(58) Field of Classification Search
CPC .............................. G06Q 10/00; G06Q 10/02
See application file for complete search history.

(56) References Cited

U.S. PATENT DOCUMENTS

| | | |
|---|---|---|
| 9,202,180 B2 | 12/2015 | Denker et al. |
| 2014/0019172 A1 | 1/2014 | Oxenhamer et al. |
| 2014/0195277 A1 | 7/2014 | Kim |
| 2014/0244320 A1* | 8/2014 | Matsui ............... G06Q 10/02 705/5 |
| 2015/0006208 A1 | 1/2015 | Nestor et al. |
| 2015/0120340 A1 | 4/2015 | Cheatham, III et al. |
| 2015/0227969 A1 | 8/2015 | Hanly |
| 2015/0242763 A1 | 8/2015 | Zamer |
| 2015/0382144 A1 | 12/2015 | Lopez |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Nabil H Syed
(74) *Attorney, Agent, or Firm* — Law Office of Jim Boice

(57) ABSTRACT

A method, system, and/or computer program product improve a function of a computer used to make a seat in a venue available to a user. One or more processors retrieve a user profile of a user that is requesting a seat in a venue, where the user profile describes a personal interest of the user. The processor(s) identify another person that shares the personal interest of the user, where the other person is currently seated at a first seat at the venue. The processor(s) identify an unoccupied second seat in proximity to the first seat.

17 Claims, 10 Drawing Sheets

(56) References Cited

U.S. PATENT DOCUMENTS

2017/0142483 A1 5/2017 Warrick et al.
2017/0364835 A1 12/2017 Baker et al.

OTHER PUBLICATIONS

Lynch, M. "Smart Seating Charts: The Key to Better Student Performance?" Editorial Projects in Education, Apr. 14, 2014. Web. Jun. 22, 2016. <http://blogs.edweek.org/edweek/education_futures/2014/04/smart_seating_charts_the_key_to_better_student_performance.html>.
Anonymous, "Converged Sensors, Data and Visualization for Optimized Seat Selection in Shared Spaces". ip.com, IPCOM000240944.
Socialtables, "Seating Chart Software That Saves You Time". Web Jun. 22, 2016 <https://www.socialtables.com/product/seating/>.
Zkipster, "Why Digital Seating Is a Must-Have". Web Jun. 22, 2016 <https://web.archive.org/web/20150912184058/https://www.zkipster.com/add-ons/zseating>.
Tixtrack, "Powerful Inventory Management Software". Web Jun. 22, 2016 <http://tixtrack.com/PRODUCTS/TIXTRACKPRO>.
Changingminds, "Seating Layout". Web Jun. 22, 2016 <http://changingminds.org/techniques/speaking/at_venue/room_layout.htm>.
Allseated, "Your Event Simplified". Web Jun. 22, 2016 <http://www.allseated.com/#!PLANNERS-AND-CATERERS/C10ZM>.
List of IBM Patents or Patent Applications Treated As Related. Aug. 2, 2018.
U.S. Appl. No. 15/191,890 Non-Final Office Action dated Feb. 5, 2018.

\* cited by examiner

SELECTIVE SEATING CONTROLLER

BACKGROUND

The present disclosure relates to the field of improving computer systems, and specifically to improving computer systems that provide access to seating at a public venue. Still more specifically, the present invention relates to improving computer systems that provide access to seating at a public venue by an improvement to the architecture of such computer systems and the resources that they control.

SUMMARY

A method, system, and/or computer program product improves a function of a computer system used to make a seat in a venue (e.g., a public venue) available to a user. One or more processors retrieve a user profile of a user that is requesting a seat in a venue, where the user profile describes a personal interest of the user. The processor(s) identify an other person that shares the personal interest of the user, where the other person is currently seated at a first seat at the venue. The processor(s) identify an unoccupied second seat in proximity to the first seat.

DETAILED DESCRIPTION

Figure 1:
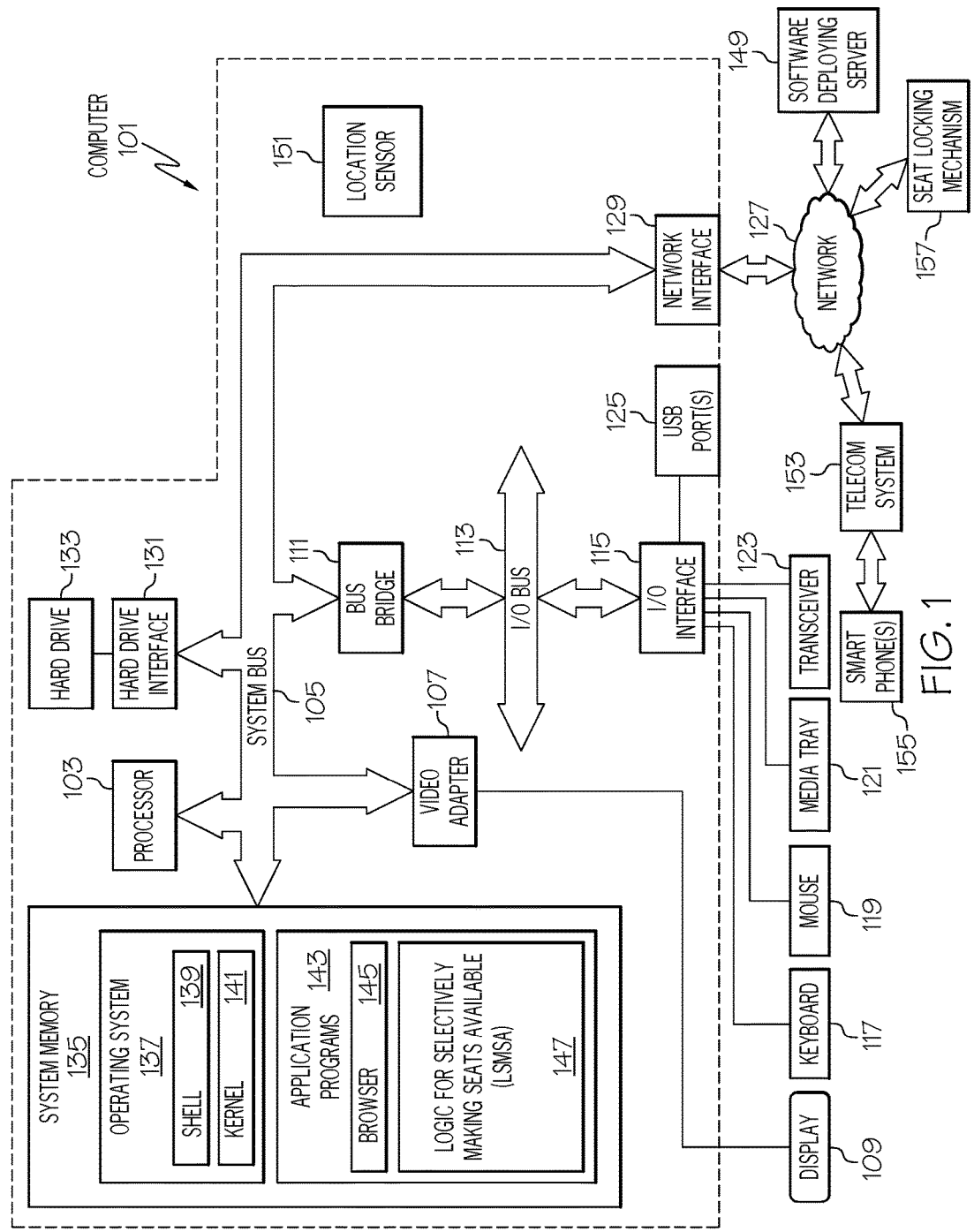
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, mechanically encoded devices such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

Embodiments of the present invention recognize that targeting, accessing and claiming seats at events (e.g., at public venues such as auditoriums) involving potentially huge crossflows of people tend to be quite challenging, especially if no reservations or group allocation schemes exist, (i.e., a "free for all"). Additionally, preferences for certain types of seating with certain characteristics such as easy aisle access, optimal views and proximity to exits, etc., may drive the quest to claim places to be even more hectic than it already normally is. Late (post-start) arrival and/or potentially lowered lighting levels exacerbate the difficulties in finding suitable seating quickly, and provision of assistance in such situations (usher, flashlight, etc.) almost always inconveniences or disturbs other attendees.

Additionally, embodiments of the present invention recognize that when viewing and/or taking pictures or video become priorities around where to sit, choices may become diminished, and "people factors" such as standees blocking sight lines play into potential success as well. Further behaviors such as individuals intentionally staggering their spots so as to avoid sitting by others makes for a veritable "broken field" to deal with when someone seeks enough room for themselves and their parties.

With reference now to the Figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or components in the telecom system 153 and/or smart phone(s) 155 shown in FIG. 1, and/or the seat controlling system 601 shown in FIG. 6, and/or the seat controlling system 701 shown in FIG. 7.

Exemplary computer 101 includes a processor 103 that is coupled to a system bus 105. Processor 103 may utilize one or more processors, each of which has one or more processor cores. A video adapter 107, which drives/supports a display 109 (which in one or more embodiments of the present invention is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of sending and receiving wireless messages, including but not limited to near field communication (NFC) messages) and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems such as telecom system 153 using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Selectively Making Seats Available (LSMSA) 147. LSMSA 147 includes code for implementing the processes described below, including those described in FIGS. 2-8. In one embodiment, computer 101 is able to download LSMSA 147 from software deploying server 149, including on an on-demand basis, wherein the code in LSMSA 147 is not downloaded until needed for execution. In one embodiment of the present invention, software deploying server 149 performs all of the functions associated with the present invention (including execution of LSMSA 147), thus freeing computer 101 from having to use its own internal computing resources to execute LSMSA 147.

Also within computer 101 is a location sensor 151, which is able to detect the physical location of computer 101. For example, location and positioning sensor 151 may incorporate global positioning system (GPS) sensors that identify the geophysical location of computers using signals from an array of space-based GPS satellites. Furthermore, location sensor 151 may use the distance and angular orientation between any two electronic transceivers (e.g., by detecting Doppler shifts, signal bounce-back timing, etc.) to detect the location and distance from one electronic device to another electronic device.

Computer 101 is also able to communicate with an enterprise network, such as a telecom (telecommunications) system 153. Examples of telecom systems include, but are not limited to, a digital subscriber line (DSL) phone line, a cellular phone system, a Voice over Internet Protocol (VoIP) telecommunications system, a hardware-based private branch exchange (PBX) phone system, etc. Telecom system 153 provides cellular communication to cell phones, such as the depicted smart phone(s) 155, which are capable of not only sending and receiving cellular phone calls, but also are capable of executing software applications and performing other software processing actions.

Computer 101 is also able to access a seat locking mechanism 157, which selectively locks a seat in an open (i.e., lower portion of the seat is folded down to allow the user to sit in the seat) or closed (i.e., the lower portion of the seat is raised, thereby preventing a user from sitting in the seat) position.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

As described herein, one or more embodiments of the present invention use data analytics (as conducted on data gathered via automatic sensing as well as via personal profile information, etc.) to generate real-time seating recommendations that take into account personal characteristics, tastes, and desires (e.g., need for special need facilities, enhanced width, extended leg room, quick access or egress, improved sound reception and/or ability for video capture) as well as current state and real-time information about the populations inhabiting the (seating) resource pool being competed for (i.e., for data analytics with reference to compatibility with "potential neighbors").

The present invention takes into account factors driving and affecting the choices made for seat and space allocation that end up being "smarter", primarily due to enhanced information access and metadata leading to higher suitability based on individual personal characteristics, tastes, and even whims. Acquisition of such information can come through automated sensing (e.g., from biometric sensors that may be worn by a user, or that may be incorporated into an electronic device, such as a smart phone) and integration of historical data (including personal profile contents), while refinement of it and identification of significant features can be achieved by appropriate analytical processing. Additionally, the analytics undertaken may include access to and leverage of current state and real-time information about the populations inhabiting the resource pool being competed for. This latter point can drive better likelihoods for individual satisfaction with placements and compatibility with those surrounding, due to common interests, profiles, etc.

It is the leverage of advanced insight coming from various data, whether sensed, interpolated or otherwise external and relevant, combined with innovative "marketplace disciplines" employed to access and lock physical resources, that together make various improvements over the prior art as disclosed by the present invention in one or more embodiments.

In one or more embodiments of the present invention, a system is able to digitally map and pursue access to and user claiming of various types of seating without hoarding. This becomes attractive for solving some or all of the previously-discussed difficulties. Mobile devices (e.g., smart phones) may be prime target platforms for any personal seat-finding and allocation solution, as being able to physically move into a candidate seating area while receiving real-time availability updates would be most advantageous. However, even a non-portable/mobile implementation is practical as well, as long as a fair remote request/allocation/enforcement scheme is put in place for seating that is "called for" and then "traveled to". These approaches differ from traditional reserved seating, in that they involve honored and enforced allocations from a "resource pool" in a dynamic, possibly even last-minute fashion, with equal access for all applicable users.

Along with digital mapping of what is available comes, in various embodiments of the present invention, a leverage of metadata about seating (i.e., recognition and alternate display modes for alternatives such as special need facilities, those with enhanced width, leg room or amenities, and even places optimized for alternative use scenarios such as quick access or egress, sound reception and/or video capture). Further, analysis and leverage of characteristic data such as for "potential neighbors" in a given area may come from customer profile information or even social media, thereby offering chances for seating choices near and/or among people who may be "compatible" according to their profile information.

In one or more embodiments of the present invention, some or all of these features combine to allow for real-time seating recommendations generated for the individual and/or their party, updated continuously as availability changes during the run-up to and commencement of a given event. For the case in which mobile application access is being used, either for claiming seating or merely maintaining status for that already claimed earlier, geolocation techniques can help with leading a user to the target seat, which may be equipped with its own signaling (e.g., an embedded light flashing) for use when the "owning" mobile app comes into close proximity of that target seat.

Furthermore, and in one or more embodiments of the present invention, seating offered as allocation candidates to a given application user will depend on their level of entitlement or where applicable, purchase.

For the challenges encountered in taking pictures or video no matter where one sits, subscriptions to photo and video streams coming from the venue or vendors with best vantage points may be opted-into, whether free or for charge.

In one or more embodiments of the present invention, implementation of an enhanced and dynamic resource reservation and claiming solution for venue seating uses an inclusion of innovative end user interfaces, algorithms for reconciliation of the desired versus the available, and access to the current state and advanced characteristic data used to drive analytics for decision making, inference discovery, and recommendation generation.

Figure 2:
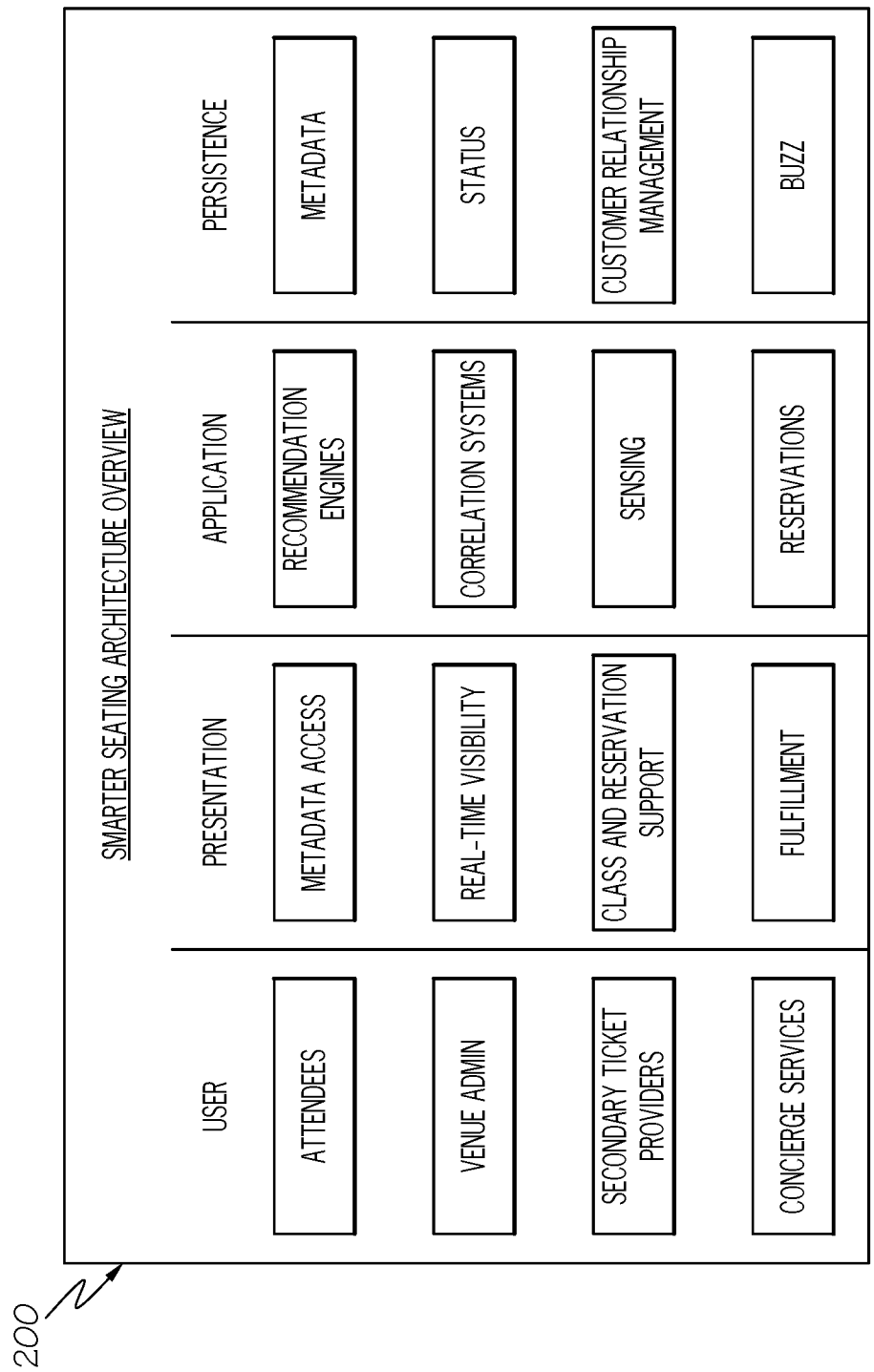
FIG. 2 illustrates a "Smarter Seating Architecture Overview" used in one or more embodiments of the present invention.

FIG. 2 presents a high-level smarter seating architecture overview 200, depicting the various functions to be delivered by consumer device, software and persistence components within the proposed invention. The functions delivered through components inferred from the above can be considered to fall into four "tiers" corresponding to end user clients (User), information aggregation (Presentation), algorithms and data manipulation (Application), and data collection and organization (Persistence). Each function shown is treated below with a corresponding short description for clarity of purpose.

User Tier—Mobile and Web Clients for All Roles

Attendees are customers for a given event (or for that matter, anything requiring organized and designated seating or space allocations). As the main beneficiaries of the intelligence and convenience delivered by the proposed invention, Attendees require the most innovation and ease of use related to end user interfaces. Additionally, reasonable support for and delivery of choices made by Attendees are fundamental "promises" that must be kept by any "smart" seat/space (or generally any other "competitive or scarce resource") allocation scheme.

Venue Administration automated systems play roles as users and cooperatives with any "smart" seat/space/service allocation approach, as their responsibilities go beyond the consumer to comprise safety, maintenance and security, among other "infrastructural" provisions.

Complementary marketers such as Secondary Ticket Providers potentially become "players" that figure in the same landscape occupied by a technology-enabled seat, etc. allocation mechanism as proposed here. Example embodiments for the present invention may include "hybrid" space sales environments in which both available seating for general admission as well as available up-sell purchases are offered. The dynamic nature of such an arrangement brings with it precise and potentially high-performance transactional needs around synchronization between systems tracking and issuing availability and those selling it at the same time.

The potential for cross- and up-selling of items and services related to attendance within a venue opens a door for Concierge Services and their like to require access to and information coming from a "smart" seating availability solution. Needs around provision of catalogs, offerings and pricing as delivered to customers (Attendees) may couple with those for order tracking, transactions and fulfillment so that comprehensive customer experience handling may be contained and remain within the "smart" system. Metadata around seating characteristics and customer uptake may potentially contribute to "tailoring" of services offered to the various types of clientele present.

Presentation Tier—Services and Tailoring for Mobile and Web Clients

Facilities for Metadata Access drive the surfacing and potential filtering of details associated with particular locations, accommodations and amenities available from within the offered/managed "pool of resources". While of utility to Attendees, these same data retrievals may have usefulness for additional client functions such as the Secondary Ticket Providers and Concierge Services.

Real-time Visibility into floor status and seating patterns may benefit the Venue Administration function, but may also assist the other User Tier roles previously detailed. Attendees may leverage visual clues to aid placements of seating requests, while Secondary Ticket Providers may target under-subscribed areas (verified visually) for "flash sales" of last-minute reserved seats. Concierge Services may target the inverse, looking for popular locations potentially more receptive to value-add or convenience offerings.

In any "hybrid" or mixed freely-available/for sale environment pertaining to what is "reserved" space, Class & Reservation Support functions may need to ensure continuous and accurate availability statuses, taking into account provision of different levels of access to potentially different levels of admission. All User Tier roles are seen to benefit from the "master allocation" views available here.

Fulfillment systems may support various transactions (cataloging, ordering, order status) and subsequent deliveries of collateral or services, ranging from last-minute reserved ticket sales (Secondary Ticket Providers, ultimately to Attendees) to amenity orders (potentially served by even Venue Administration) to other convenience/experience-enhancing offerings (Concierge Services).

Application Tier—Data Aggregation, Analytics, Refinement and Expression

Recommendation engines play roles primarily benefiting Attendees, but may also facilitate the operations of Secondary Ticket Providers, as the various metadata pertaining to desirability/availability of certain areas (great for photos, superior sound, etc.) get factored into what may become noor extra-cost possibilities. Concierge Services may be involved as well, potentially offering to find, isolate and reserve areas based on expressed user desires, thereby removing the "compete" burden from individual customers. Optimization functions may ferret out prime seating from still-available seating, taking into account location-dependent characteristics as well as individual user preferences, the latter coming from on-hand profile information or perhaps ad-hoc inputs. Social media, whether resolved to the personal level or not, may contribute previous sentiment and feedback pertaining to venue and specific location attributes to help steer optimization decisions and ultimately, seating recommendations.

Correlation systems perform the necessary operations around bringing all of the previously-discussed information together to make available the views exploited by the various roles in the User and Presentation Tiers.

Sensing functions (e.g., cameras providing real-time streaming images) may support and drive provision of the information brought to bear by the previously-discussed Real-time Visibility facility, but may also potentially be key to Class & Reservation Support ("what is" versus "what's tracked") and Fulfillment (verification).

Reservations are where "tracking meets reality", and where enforcement of what has been allocated (automated or otherwise) meets the physical. As the "master arbiter", this componentry may drive other functions such as Class & Reservation Support and Fulfillment, reaching further toward what gets eventually presented to the User Tier roles.

Persistence Tier—Data Acquisition, Maintenance and Management

A repository for venue details may hold Metadata ranging from dimensions, pathways, fire exits, convenience facilities and provision of utilities all the way to the aforementioned characteristics around sight lines and lighting (photo opportunities), acoustics and potentially things like seat width, spacing, etc.

Status regarding resources under allocation (such as seating) is persisted in a real-time, consistent and recoverable manner, and includes support for locking/unlocking, whether temporary (during reservation transactions) or permanent (reserved).

Leverage of Marketplaces (electronic or otherwise) by entities such as Secondary Ticket Providers or even other "outsiders" is provided for, and information integrations necessary to keep their operations consistent and in line with the primary allocation schemes are provided by sensors, databases, etc.

Customer Relationship Management is part of any scheme involving consumers and/or vendors/suppliers. Thus, support for customized profiles and customer track records influencing treatments and provision of offerings (including marketing) help drive virtually all up-line systems previously described here.

Social media and associated "Buzz" play roles today around the perception held for and reception given to the events, offerings and "brands" put forth for organized gatherings even beyond those of an entertainment nature. Capture and leverage of pertinent interest and opinion trending information may benefit higher-level functions previously discussed here, including those for Secondary Ticket Providers (pricing, etc.) and Concierge Services as examples.

Figure 3:
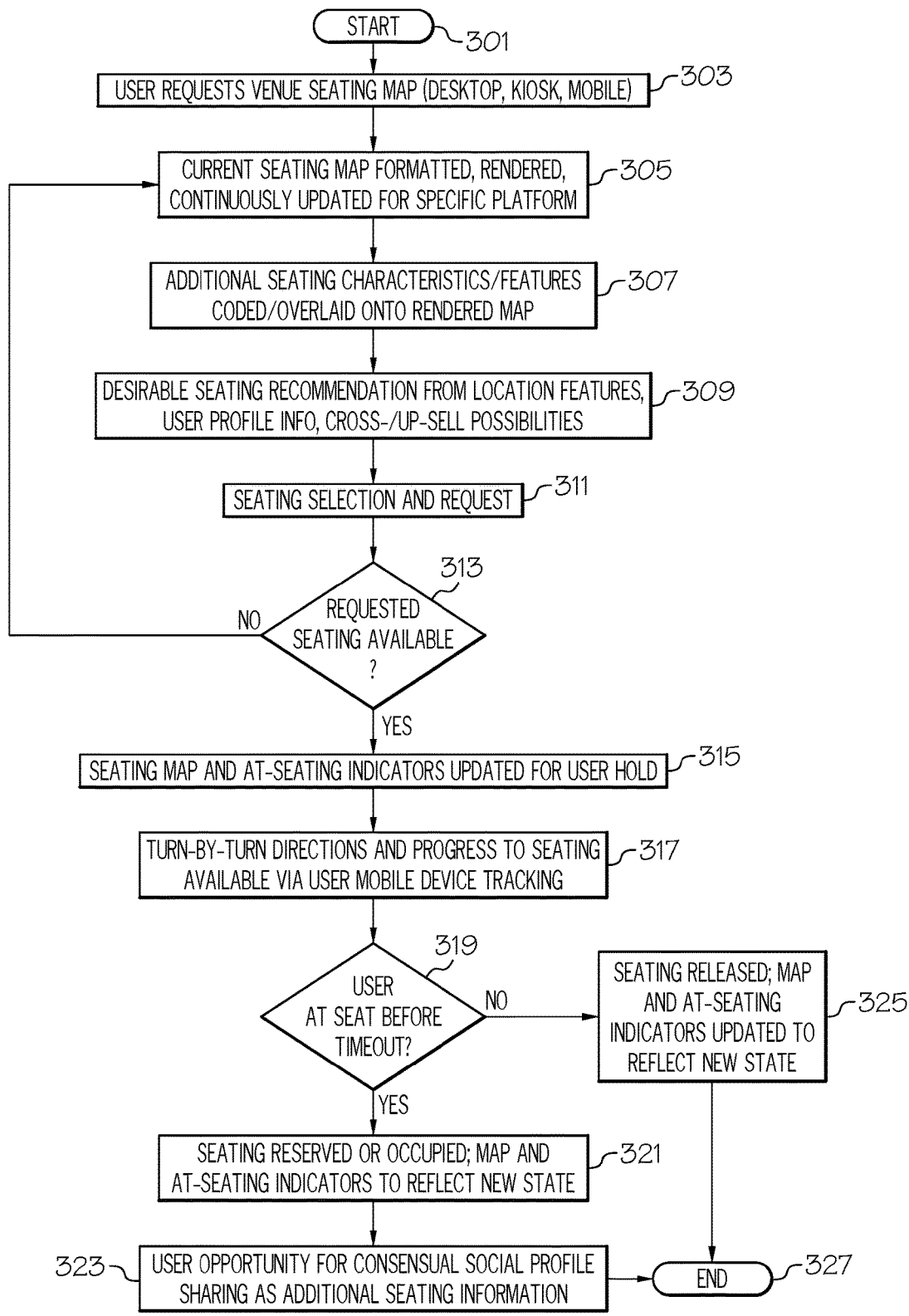
FIG. 3 is a high-level flow chart of one or more steps performed by one or more processors and/or other hardware devices according to one or more embodiments of the present invention to reserve a seat in a venue for a user.
Figure 4:
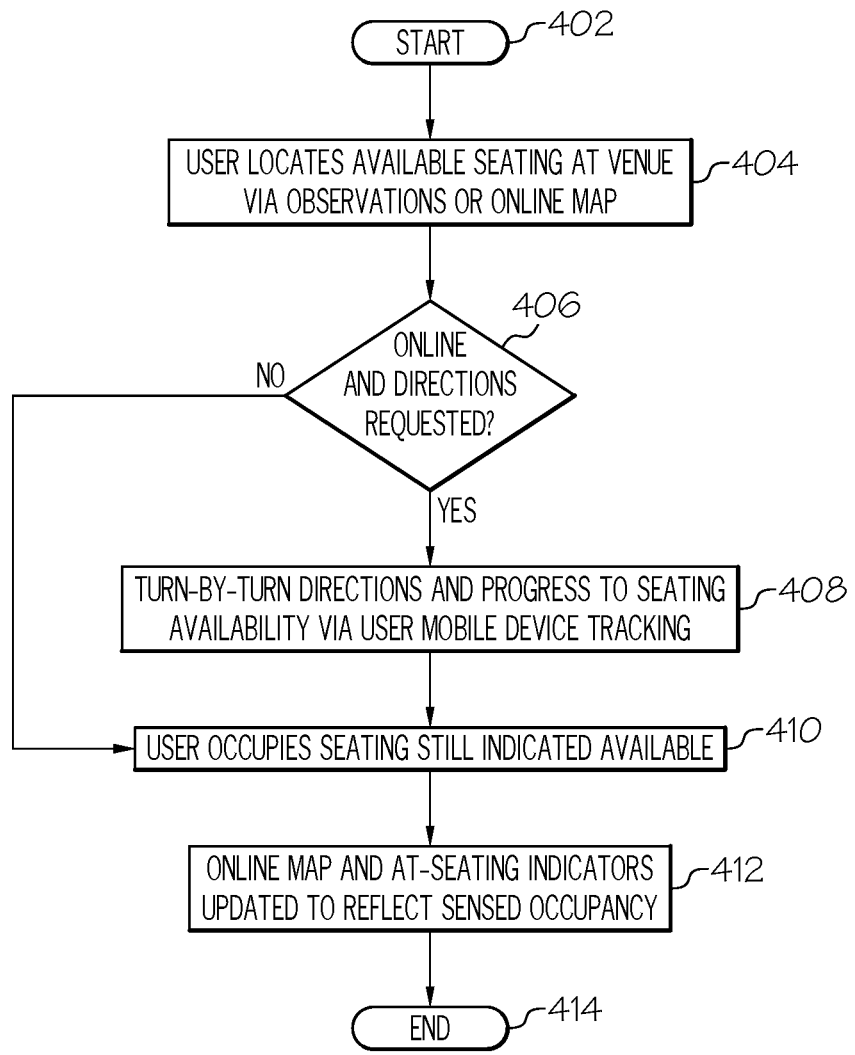
FIG. 4 is a high-level flow chart of one or more steps performed by one or more processors and/or other hardware devices according to one or more embodiments of the present invention to enable a user to locate a reserved seat in a venue.
Figure 5:
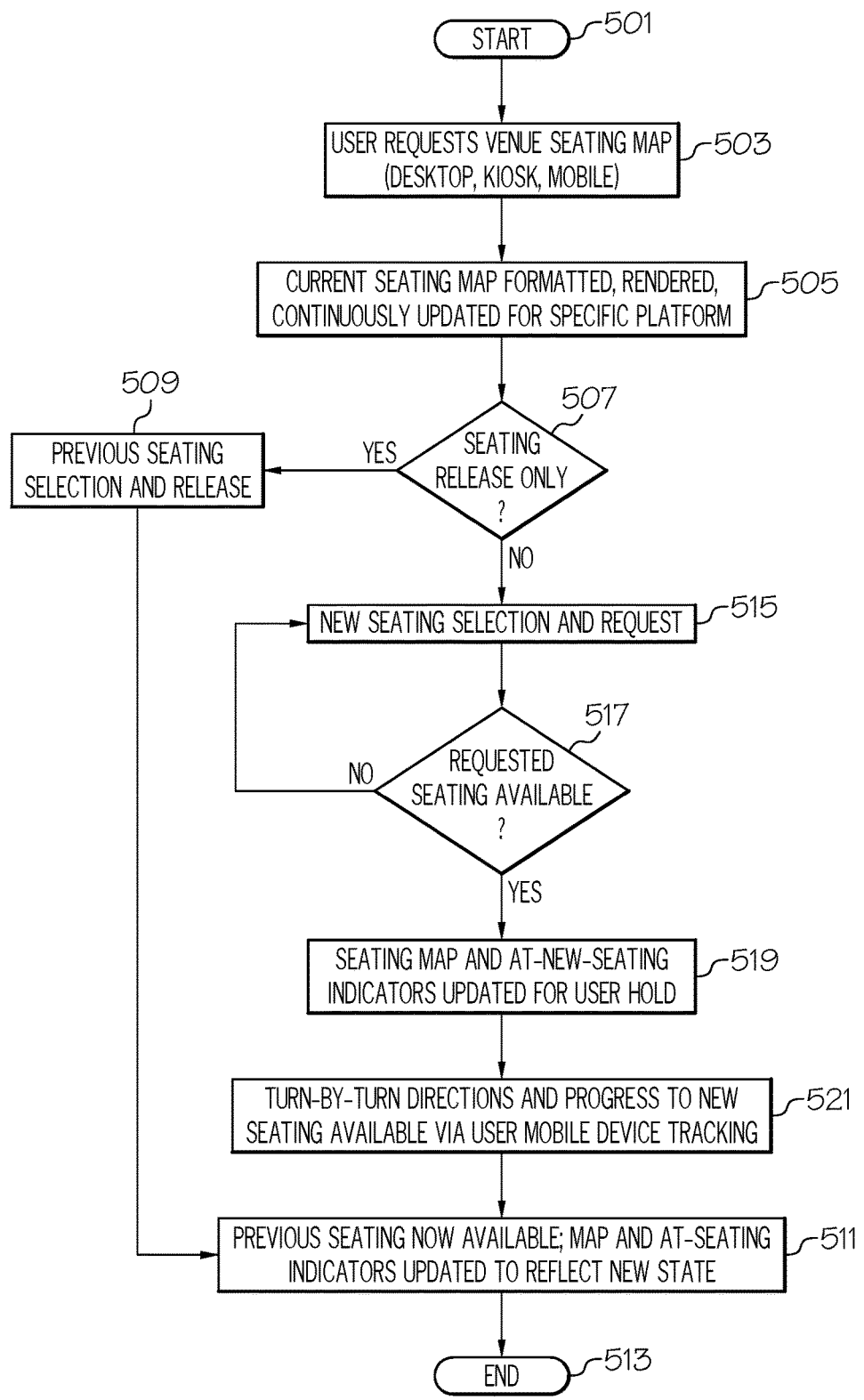
FIG. 5 is a high-level flow chart of one or more steps performed by one or more processors and/or other hardware devices according to one or more embodiments of the present invention to enable a user to release a previously reserved seat in a venue.

With reference now to FIGS. 3-5, exemplary sets of Use Cases illustrate value propositions and workings of the present invention from the perspective of an event Attendee. The information in these figures is based on the following assumptions:

1) Continuous sensing keeps seating availability current within the Status persistence function.

2) Mobile-device-resident and Web applications give all user roles qualified access to the real-time seating availability "picture".

3) User seating preferences may be input and ranked either through stored individual profile information or ad-hoc entries.

4) Correlation and optimization functions recommend best available seating based on all characteristic and preference input, and then support temporary resource locking to allow user committal (or not).

5) Recommendation generation goes far beyond seating characteristic matching by taking into account current attendee location(s), active selling of the same "pool" taking place simultaneously, and even audience group compatibility (same age ranges, generations, general philosophical views, etc.).

6) Social media aspects may drive the aforementioned audience compatibility matching via gathering of accessibility-granted individual attributes around sports interests, political affiliations/views, professional associations, volunteer participation, and hobbies, etc.

Thus, with reference to FIG. 3, assume that the Attendee is performing (or has performed) an online search for a seat and is making (or has made) a reservation for that seat.

After initiator block 301, a user requests a current venue seating map from a remote or on-premises platform, (i.e., desktop/laptop, kiosk/station, personal phone/tablet), as described in block 303.

As shown in block 305, the current seating map is formatted to be displayed with real-time and sensed updates. Seating statuses range from available to held to reserved to occupied.

As shown in block 307, per-seating metadata is superimposed on the display, showing such information as front row, extra legroom, aisle proximity, social profile compatibility, video/audio advantage, etc.

As shown in block 309, analytics-driven recommendations are highlighted (e.g., seat group contiguity, placement preferences from stored profiles, "neighbor" compatibility, competing sales patterns, upsell/cross-sell (premium seating, video/audio) possibilities).

As described in block 311, the seating selection is made via direct interaction with the displayed map and/or a form.

As described in query block 313, an availability check returns successful hold or loss (return to map, potentially split requested locations).

As described in block 315, seating is mapped as held, with a warning to move to reserved/occupied or suffer release on timeout. At-seating indicators (e.g., lighting on the seat) reflect a hold status on the seat for a particular user.

As described in block 317, turn-by-turn directions and progress to available seating are sent to a user mobile device (e.g., a smart phone) via location tracking provided by the user mobile device.

As described in query block 319, if the user arrives at the particular seat within a predetermined amount of time, then the seat is reserved via deposit or occupied, and the map is adjusted to show this event (block 321).

As described in block 323, the seat reservation or occupancy presents the user with an opportunity for consensual sharing of social compatibility profile data, i.e., "who's near me?".

Returning to query block 319, if the user does not arrive at the designated seat in time, then that seat is released, as described in block 325. The released seat is then reflected in an updated digital map, which is sent to one or more users.

The flow chart of FIG. 3 ends at terminator block 327.

With reference now to FIG. 4, a flow-chart depicting steps performed by one or more processes for handling an on-premises ad hoc claim (e.g., where the user dynamically chooses where to sit after arriving at the venue) is presented.

After initiator block 402, the at-venue user locates available seating via an online venue map or physically observes seating indicated as available (block 404).

As indicated in query block 406, the user optionally requests turn-by-turn directions to or simply proceeds to targeted seating.

If so, then such directions are sent to the user (block 408) and the user occupies the seating (still indicated available) without further interaction with map, system, etc. (block 410).

As described in block 412, a sensed occupancy (e.g., as detected by pressure sensors within the seat) changes at-seating indicators and mapped status to reflect this seat state change (i.e., the user is sitting in it).

The flow-chart in FIG. 4 ends at terminator block 414.

With reference now to FIG. 5, a high-level flow-chart of one or more steps performed by one or more processors and/or other hardware devices to allow a user to release a reservation for a seat is presented.

After initiator block 501, a user makes an on- or off-premises request for a current venue seating map by using an appropriate device, (i.e., desktop/laptop, kiosk/station, phone/tablet), as described in block 503.

As shown in block 505, the venue seating map is formatted for and displayed on a requesting device.

As shown in query block 507, the user may seek to improve the location of his reserved seat or release present seating, as described in block 509.

As described in block 511, the user identifies his/her present seating (reserved or occupied) on the digital map, and releases his/her current seating (and optionally requests a new seating via map interface). In one or more embodiments of the present invention, there is a delayed release of the old reservation/occupancy of the seat until a new reservation/occupancy of a new seat goes through. That is, as shown in blocks 515 through 519, before the user actually releases an old reservation, a new seat is selected (block 515), confirmation is made that the new seat is available (query block 517), and the map is revised upon the new reservation going through (block 519). Thereafter, the user is given directions to the new seat (block 521).

The flow-chart ends at terminator block 513.

In various embodiments of the present invention, any seating taken by confirmed online reservation, purchase, or ad-hoc claiming (Occupied), remains in at least a Reserved status until explicitly released, thereby supporting an occupant's coming and going without fear of seat loss. An optional embodiment may have a timeout value applied and releases a seat as Available if an occupant leaves the seat for an extended amount of time (unless the absence is due to a personal emergency, as reported by the user on his/her smart phone to the managing system). If the user fails to explain to the system why he/she has left his/her seat, then the seat will be reopened/reallocated for use by another user.

In one or more embodiments of the present invention, sensing and/or surveillance is combined with programmatic tracking in order to provide as clear a "reality" picture as possible, thereby supporting conflict resolution and enforcement of good manners and fair play by venue ushers and/or security.

Although the Attendee role has been focused upon in the above, it is to be understood that technological devices perform the actual features described herein.

As described herein, the present invention takes into account factors driving and affecting the choices made for seat and space allocation that end up being "smarter", primarily due to enhanced information access and metadata leading to higher suitability based on individual personal characteristics, tastes, and even whims. Acquisition of such information can come through automated sensing and integration of historical data (including personal profile contents), while refinement of it and identification of significant features can be achieved by appropriate analytical processing. Additionally, the analytics undertaken may include access to and leverage of current state and real-time information about the populations inhabiting the resource pool being competed for. This helps drive better likelihoods for individual satisfaction with placements and compatibility with those surrounding, due to common interests, education levels, etc.

Figure 6:
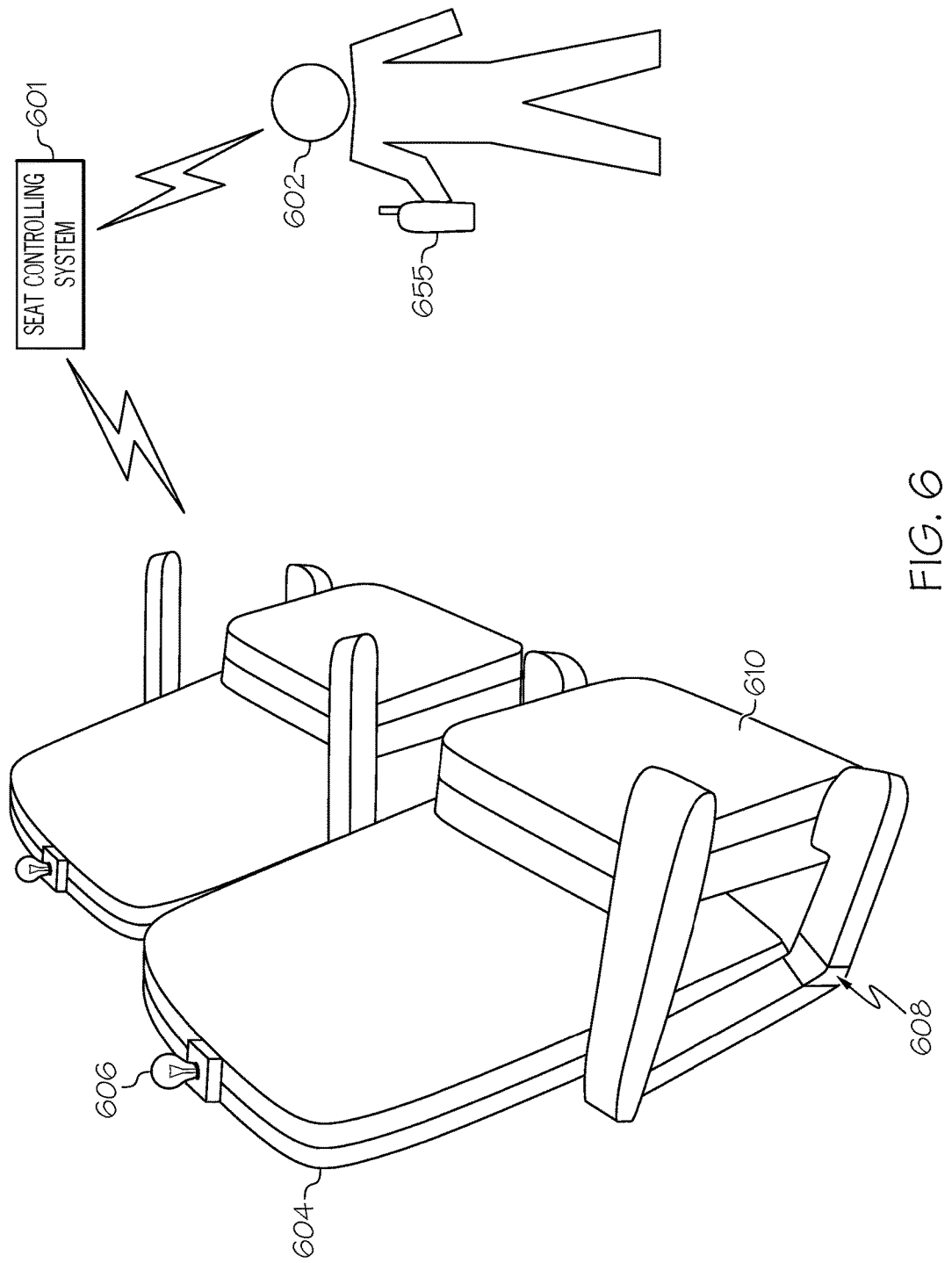
FIG. 6 depicts a seat in a venue equipped with a visual indicator and an electromechanical locking mechanism that support making a seat available to a particular user in accordance with one or more embodiments of the present invention.

Thus, consider now FIG. 6, which depicts a user 602 reserving and/or searching for his reserved seat 604. As described herein, the user is able to use his smart phone 655 to reserve seat 604, and to then use phone 655 to display turn-by-turn directions or digital map of the venue to reach seat 604 that he has reserved. Such direction/map is sent by a seat controlling system 601, which is able to communicate with phone 655.

Phone 655 may also provide biometric sensor functions. For example, assume that user 602 has a neurological illness that makes walking extended distances very difficult. Assume further that phone 655 has sensors that identify an acute condition (caused by the neurological illness) that makes walking to a reserved seat in an upper balcony difficult for user 602. As such, the biometric sensor (e.g., that detects muscular tremors, shortness of breath, etc. using sound sensors, vibration sensors, etc.) in phone 655 will change the reservation from seat 604 (in the upper balcony) to another seat (not depicted) that is closer (e.g., near the current location of user 602). While such biometrics sensors are described as being integrated into phone 655, they may also be dedicated biometric sensors (e.g., a heart monitor—not shown) that is worn by the user 602).

In one or more embodiments of the present invention, seat controlling system 601 physically configures seat 604 in order to make it accessible to user 602. For example, assume that seat 604 has an electromechanical locking mechanism 608, which selectively locks folding cushion 610 in seat 604 in an up position (as depicted), such that seat 604 cannot be used, or in an unlocked position (not depicted), such that the user 602 can push down the folding cushion 610 in order to sit on it. For example, electromechanical locking mechanism 608 may include a receiver that receives a signal from seat controlling system 601. This signal may direct an electromagnetic actuator, or any other mechanical device capable of selectively locking the position (up or down) of folding cushion 610 by repositioning a locking feature (e.g., a bar, a ratchet, etc.) that selectively restricts movement of the folding cushion 610. That is, when the seat 604 is reserved, an electric current is supplied that enables movement of a magnetic rod, bar, etc., or other mechanism into position to restrict folding cushion 610 from freely moving into an open position. When the electric current is removed, the electromagnetic actuator is turned off, the locking feature moves to an unlocked position, and the folding cushion 610 is no longer restricted.

Similarly, seat controlling system 601 can turn on a light such as indicator 606 under various conditions, such as when seat 604 is available to be reserved; when user 602 is within a certain proximity of seat 604; when user 602 is outside a certain proximity of seat 604; when the electromechanical locking mechanism 608 on seat 604 has locked the folding cushion 610 in the upright position; when the electromechanical locking mechanism 608 on seat 604 has unlocked the folding cushion 610 such that it can be put into the down position for sitting thereupon, etc.

Figure 7:
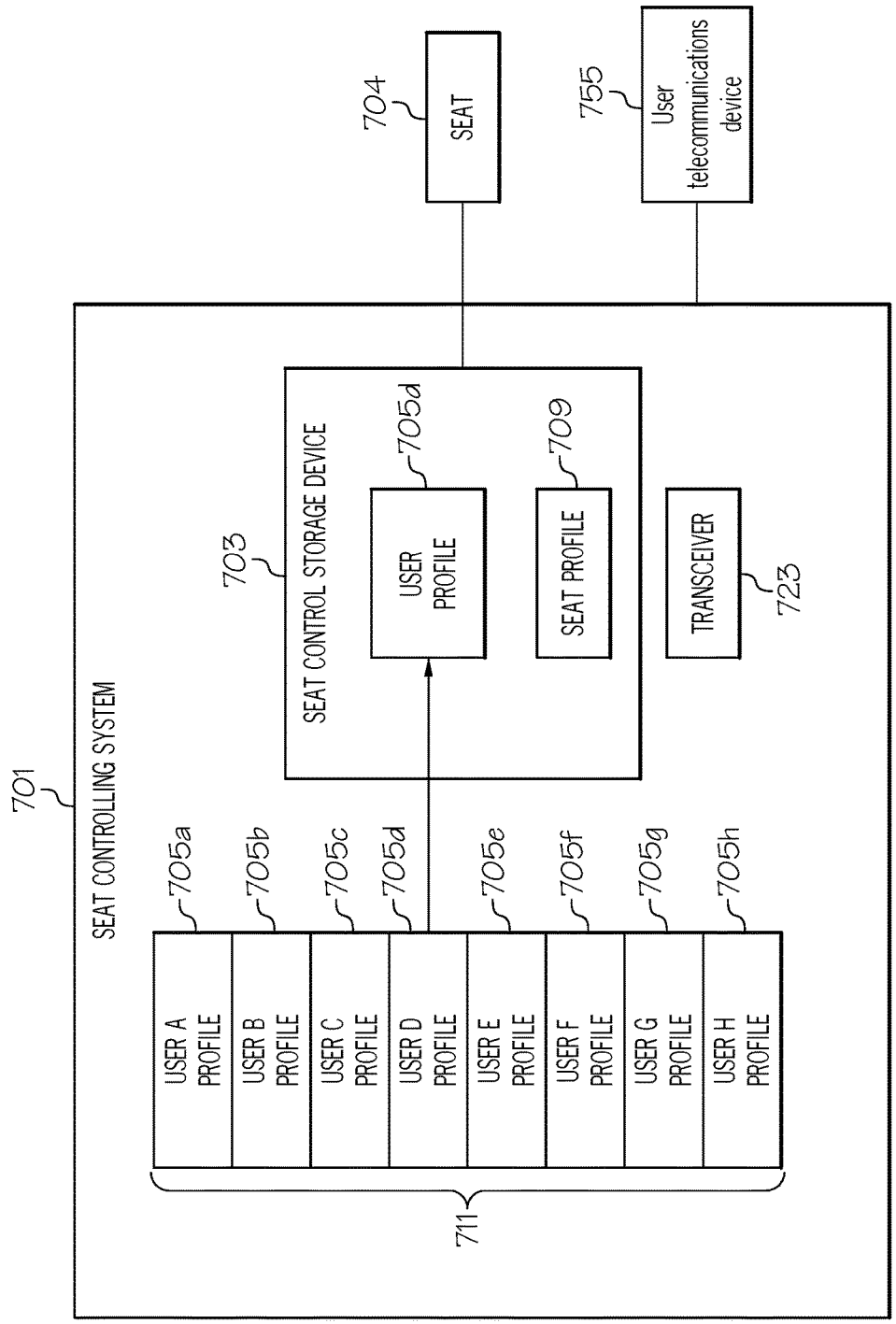
FIG. 7 illustrates detail of a modified and novel architecture of a seat controlling system in accordance with one or more embodiments of the present invention.

With reference now to FIG. 7, in one or more embodiments of the present invention seat controlling system 701 (analogous to seat controlling system 601 shown in FIG. 6) includes a seat control storage device 703, which is dedicated to the exclusive use of seat 704 (analogous to seat 604 shown in FIG. 6). Seat control storage device 703 is a high speed small memory (e.g., a register, small cache, etc.).

As shown in FIG. 7, assume that a database 711 in (or accessible to, e.g., via a cloud of remote resources) seat controlling system 701 has profiles 705a-705h for Users A-H. Each of the profiles 705a-705h includes information about any seating preferences, medical conditions, current location, seat reservation status, etc. of the corresponding Users A-H. Assume now that User D has reserved seat 704. Thus, user profile 705d associated with User D is stored in the seat control storage device 703, along with seat profile 709 that identifies the location, price, reservation status, and/or physical features of reserved seat 704. The seat controlling system 701 retrieves a seat profile 709 from seat 704 (e.g., as a unique identifier for seat 704). Seat controlling system 701 thus reads the user profile 705d and the seat profile 709 from the seat control storage device 703, in order to send a signal from transceiver 723 to the user telecommunication device 755 (analogous to the phone 655 held by user 602 in FIG. 6) that 1) informs User D that he has reserved seat 704, and/or 2) provides User D with directions to seat 704. This provides a technological improvement to seat controlling system 701 over the prior art in that transceiver 723 is able to send information based on user profile 705d and seat profile 709 that is stored in the high-speed small seat control storage device 703, rather than pulling this information from the larger/slower database 711 (e.g., which may be from hard drive 133 shown in FIG. 1). This results in a faster system for reserving seats and/or providing directions to such seats.

Figure 8:
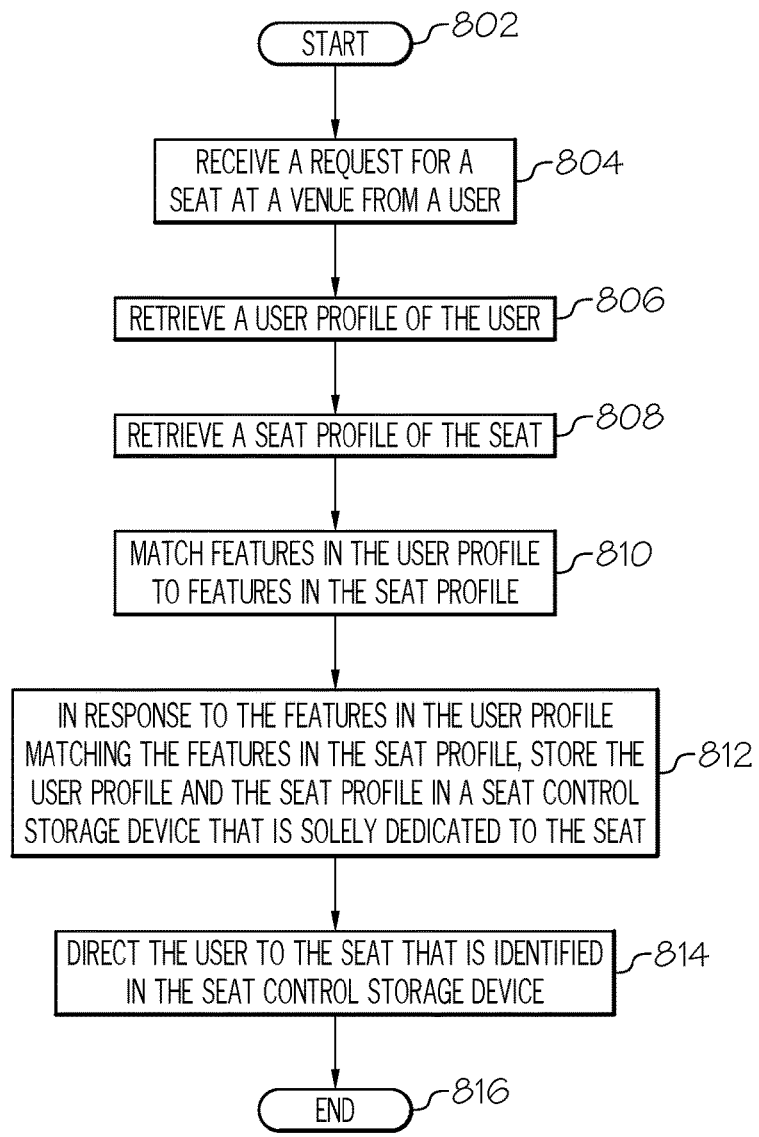
FIG. 8 is a high level flow chart of one or more steps performed by one or more processors and/or other hardware equipment to provide availability of a seat in a venue to a specific user.

With reference now to FIG. 8, a high level flow chart of one or more steps performed by one or more processors and/or other hardware equipment to provide availability of a seat in a venue to a specific user is presented.

After initiator block 802, one or more processors (e.g., processor 103 when part of seat controlling system 601 shown in FIG. 6) receive a request (e.g., from phone 655 shown in FIG. 6) for a seat (e.g., seat 604) at a venue from a user (e.g., user 602), as described in block 804.

As described in block 806, the processor(s) retrieve a user profile (e.g., profile 705d shown in FIG. 7) of the user, as well as a seat profile (e.g., seat profile 709 shown in FIG. 7) of the seat, as described in block 808.

The processor(s) then match (to a predefined matching threshold) features in the user profile to features in the seat profile, as described in block 810.

As depicted in block 812, in response to the features in the user profile matching the features in the seat profile, the processor(s) store the user profile and the seat profile in a seat control storage device (e.g., seat control storage device 703) that is solely dedicated to the seat.

As described in block 814, the processor(s) then send a signal to an electronic device, directing the user to the seat that is identified in the seat control storage device. As described herein, the user is identified by the user profile in the seat control storage device, and the seat is identified by the seat profile in the seat control storage device.

The flow chart in FIG. 8 ends at terminator block 816.

In an embodiment of the present invention, in response to the features in the user profile matching the features in the seat profile, the processor(s), using transceiver 723 shown in FIG. 7, selectively transmit a signal to an electromechanical locking mechanism (e.g., electromechanical locking mechanism 608 shown in FIG. 6) to unlock a folding cushion on the seat.

In an embodiment of the present invention, the processor(s) receive a positioning signal (e.g., from location sensor 151 shown in FIG. 1 when incorporated into phone 655 shown in FIG. 6) indicating a real-time location of the user. In response to the positioning signal indicating that the user is within a predetermined proximity of the seat, the processor(s) transmit (via transceiver 723 shown in FIG. 7) the signal to the electromechanical locking mechanism to unlock the folding cushion on the seat.

In an embodiment of the present invention, the processor(s) receive a positioning signal indicating a real-time location of the user. In response to the positioning signal indicating that the user is outside of a predetermined proximity of the seat, the processor(s) block transmission of the signal to the electromechanical locking mechanism that would have unlocked the folding cushion on the seat, thereby keeping the folding cushion 610 shown in FIG. 6 in the locked upright (and therefor unusable) position.

In an embodiment of the present invention, the processor(s) transmit (via transceiver 723 shown in FIG. 7) directions to the user that provide a turn-by-turn set of instructions to direct the user from a current location of the user (as determined by the location sensor 151 shown in FIG. 1 when incorporated into phone 655 shown in FIG. 6) to a location of the seat.

In an embodiment of the present invention, the processor(s) transmit a digital map to the user, where the digital map depicts a location of the seat relative to a current location of the user.

In an embodiment of the present invention, the processor(s) receive a positioning signal indicating a real-time location of the user, and in response to the positioning signal indicating that the user is within a predetermined proximity of the seat, activate a visual indicator (e.g., indicator 606 shown in FIG. 6) on the seat, where the visual indicator indicates that the seat is reserved for and available to the user.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
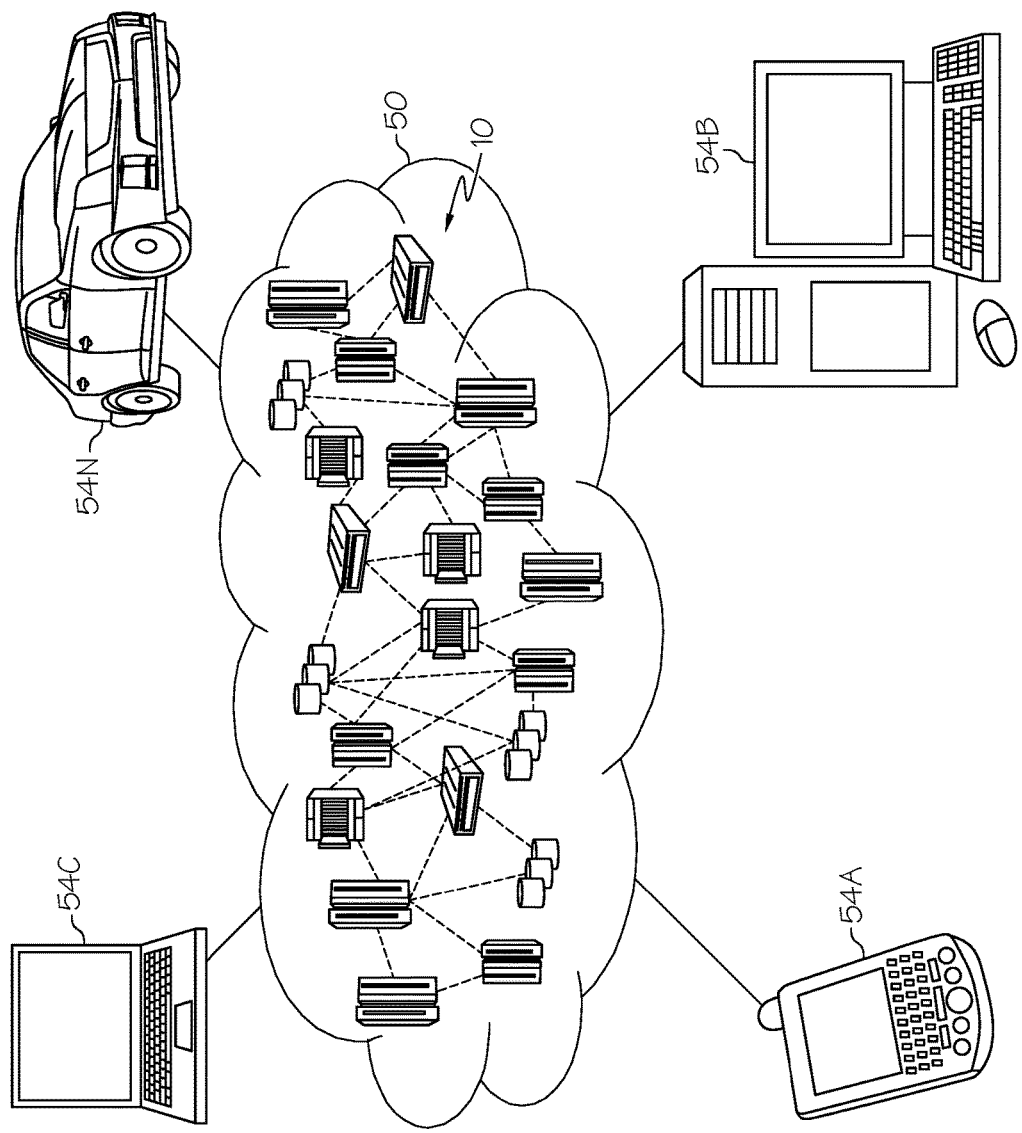
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 9 are intended to be illustrative only and that computing nodes 10 and cloud computing environment 50 can communicate with any type of computerized device over any type of network and/or network addressable connection (e.g., using a web browser).

Figure 10:
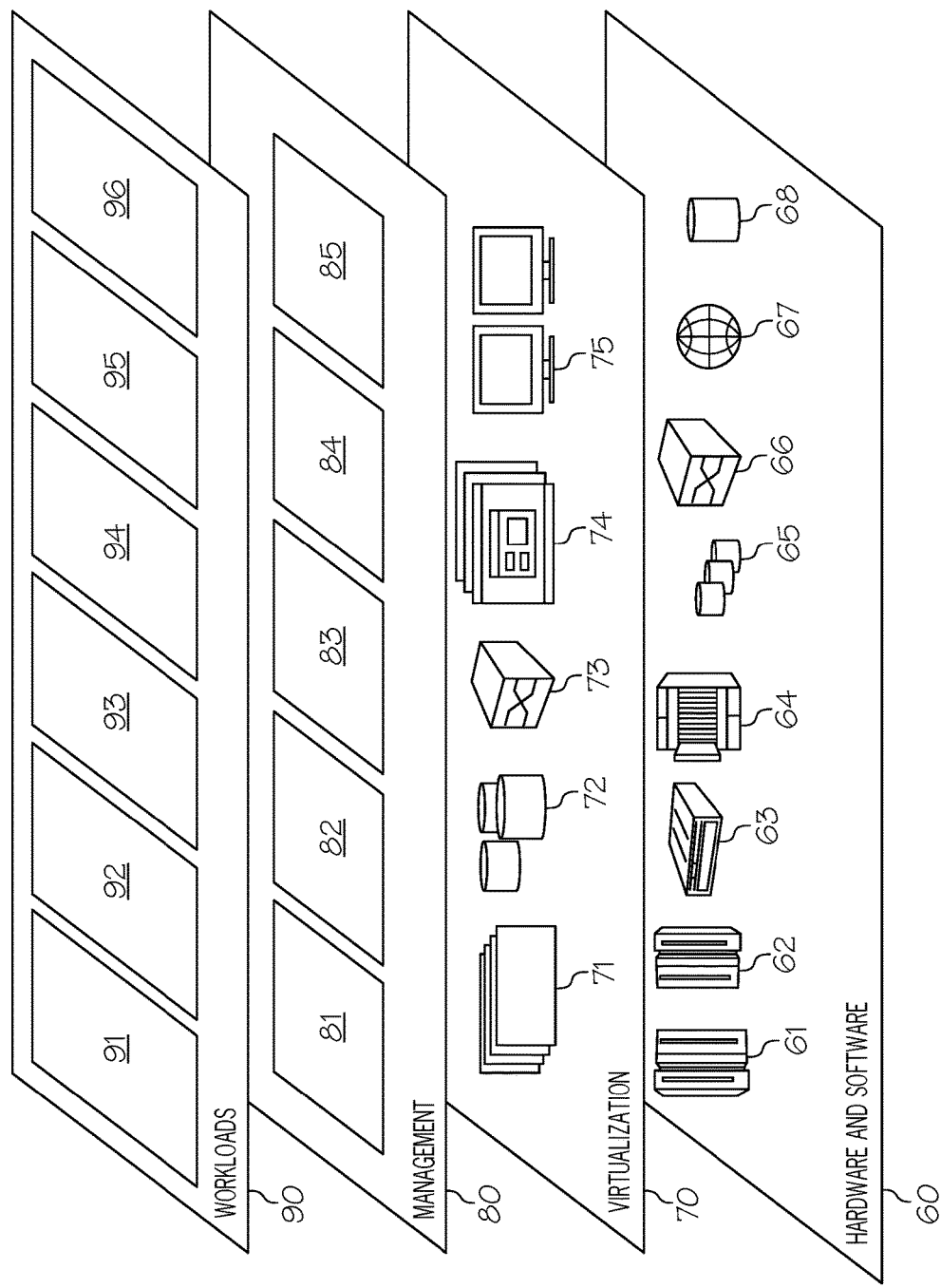
FIG. 10 depicts abstraction model layers of a cloud computer environment according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and selective seat access processing 96, which performs one or more functions described for the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present application in detail and by reference to illustrative embodiments thereof, it will be apparent that modifications and variations are possible without departing from the scope of the present invention defined in the appended claims.

What is claimed is:
1. A method comprising:
retrieving, by one or more processors, a user profile of a user that is requesting a first seat in a venue, wherein the first seat is reserved for the user;
receiving, by one or more processors, positioning signal readings indicating a real-time location of the user, wherein the positioning signal readings are real-time sensor readings that describe a current physical location of the user within the venue relative to a physical location of the first seat in the venue;
receiving, by one or more processors, biometric sensor readings for the user, wherein the biometric sensor readings are real-time sensor readings that describe a condition that limits movement abilities of the user;
in response to receiving the biometric sensor readings that describe the condition that limits the movement abilities of the user, identifying, by one or more processors, an unoccupied second seat at the venue that is available and is closer to the user than the first seat; and
in response to identifying the available and closer unoccupied second seat, activating a visual indicator on the unoccupied second seat.
2. The method of claim 1, further comprising:
transmitting, by one or more processors, a signal to an electromechanical locking mechanism to unlock a folding cushion on the unoccupied second seat.
3. The method of claim 2, further comprising:
in response to a positioning signal indicating that the user is within a predetermined proximity of the unoccupied second seat, transmitting, by one or more processors, the signal to the electromechanical locking mechanism to unlock the folding cushion on the unoccupied second seat; and
unlocking the folding cushion on the unoccupied second seat by the electromechanical locking mechanism.
4. The method of claim 2, further comprising:
in response to a positioning signal indicating that the user is outside of a predetermined proximity of the unoccupied second seat, blocking, by one or more processors, transmission of the signal to the electromechanical locking mechanism that would have unlocked the folding cushion on the unoccupied second seat.
5. The method of claim 1, further comprising:
transmitting, by one or more processors, directions to the user, wherein the directions provide a turn-by-turn set of instructions to direct the user from a current location of the user to a location of the unoccupied second seat.
6. The method of claim 1, further comprising:
transmitting, by one or more processors, a digital map to the user, wherein the digital map depicts a location of the unoccupied second seat relative to a current location of the user.
7. A computer program product comprising one or more computer readable storage mediums, and program instructions stored on at least one of the one or more computer readable storage mediums, the stored program instructions comprising:
program instructions to retrieve a user profile of a user who is requesting a first seat in a venue, wherein the first seat is reserved for the user;
program instructions to receive positioning signal readings indicating a real-time location of the user, wherein the positioning signal readings are real-time sensor readings that describe a current physical location of the user within the venue relative to a physical location of the first seat in the venue;
program instructions to receive biometric sensor readings for the user, wherein the biometric sensor readings are real-time sensor readings that describe a condition that limits movement abilities of the user;

program instructions to, in response to receiving the biometric sensor readings that describe the condition that limits the movement abilities of the user, identify an unoccupied second seat at the venue that is available and is closer to the user than the first seat; and program instructions to, in response to identifying the available and closer unoccupied second seat, activate a visual indicator on the unoccupied second seat.

8. The computer program product of claim 7, further comprising:

program instructions to transmit a signal to an electromechanical locking mechanism to unlock a folding cushion on the unoccupied second seat.

9. The computer program product of claim 8, further comprising:

program instructions to, in response to a positioning signal indicating that the user is within a predetermined proximity of the unoccupied second seat, transmit the signal to the electromechanical locking mechanism to unlock the folding cushion on the unoccupied second seat; and unlocking the folding cushion on the unoccupied second seat by the electromechanical locking mechanism.

10. The computer program product of claim 8, further comprising:

program instructions to, in response to a positioning signal indicating that the user is outside of a predetermined proximity of the unoccupied second seat, block transmission of the signal to the electromechanical locking mechanism that would have unlocked the folding cushion on the unoccupied second seat.

11. The computer program product of claim 7, further comprising:

program instructions to transmit directions to the user, wherein the directions provide a turn-by-turn set of instructions to direct the user from a current location of the user to a location of the unoccupied second seat.

12. The computer program product of claim 7, further comprising:

program instructions to transmit a digital map to the user, wherein the digital map depicts a location of the unoccupied second seat relative to a current location of the user.

13. A computer system comprising one or more processors, one or more computer readable memories, and one or more computer readable storage mediums, and program instructions stored on at least one of the one or more computer readable storage mediums for execution by at least one of the one or more processors via at least one of the one or more computer readable memories, the stored program instructions comprising:

program instructions to retrieve a user profile of a user who is requesting a first seat in a venue, wherein the first seat is reserved for the user;

program instructions to receive positioning signal readings indicating a real-time location of the user, wherein the positioning signal readings are real-time sensor readings that describe a current physical location of the user within the venue relative to a physical location of the first seat in the venue;

program instructions to receive biometric sensor readings for the user, wherein the biometric sensor readings are real-time sensor readings that describe a condition that limits movement abilities of the user;

program instructions to, in response to receiving the biometric sensor readings that describe the condition that limits the movement abilities of the user, identify an unoccupied second seat at the venue that is available and is closer to the user than the first seat; and program instructions to, in response to identifying the available and closer unoccupied second seat, activate a visual indicator on the unoccupied second seat.

14. The computer system of claim 13, further comprising:

program instructions to transmit a signal to an electromechanical locking mechanism to unlock a folding cushion on the unoccupied second seat.

15. The computer system of claim 14, further comprising:

program instructions to, in response to a positioning signal indicating that the user is within a predetermined proximity of the unoccupied second seat, transmit the signal to the electromechanical locking mechanism to unlock the folding cushion on the unoccupied second seat; and unlocking the folding cushion on the unoccupied second seat by the electromechanical locking mechanism.

16. The computer system of claim 14, further comprising:

program instructions to, in response to a positioning signal indicating that the user is outside of a predetermined proximity of the unoccupied second seat, block transmission of the signal to the electromechanical locking mechanism that would have unlocked the folding cushion on the unoccupied second seat.

17. The computer system of claim 13, further comprising:

program instructions to transmit directions to the user, wherein the directions provide a turn-by-turn set of instructions to direct the user from a current location of the user to a location of the unoccupied second seat.

* * * * *